United States Patent
Wei et al.

(10) Patent No.: US 9,578,667 B2
(45) Date of Patent: Feb. 21, 2017

(54) USER EQUIPMENT, BASE STATION, AND METHOD OF ENABLING USAGE OF RESOURCES FOR A DEVICE-TO-DEVICE DISCOVERY

(71) Applicant: Sony Corporation, Tokyo (JP)

(72) Inventors: Na Wei, Beijing (CN); Brian Alexander Martin, Weybridge (GB)

(73) Assignee: SONY MOBILE COMMUNICATIONS INC., Tokyo (JP)

( * ) Notice: Subject to any disclaimer, the term of this patent is extended or adjusted under 35 U.S.C. 154(b) by 152 days.

(21) Appl. No.: 14/467,379

(22) Filed: Aug. 25, 2014

(65) Prior Publication Data

US 2015/0327311 A1 Nov. 12, 2015

Related U.S. Application Data

(63) Continuation of application No. PCT/CN2014/077121, filed on May 9, 2014.

(51) Int. Cl.
| | |
|---|---|
| H04W 40/24 | (2009.01) |
| H04W 72/10 | (2009.01) |
| H04W 76/02 | (2009.01) |
| H04L 12/911 | (2013.01) |
| H04W 68/00 | (2009.01) |
| H04W 76/04 | (2009.01) |
| H04W 8/00 | (2009.01) |
| H04L 29/06 | (2006.01) |
| H04W 4/06 | (2009.01) |
| H04L 12/64 | (2006.01) |

(52) U.S. Cl.
CPC ........ *H04W 76/023* (2013.01); *H04L 12/6418* (2013.01); *H04L 47/70* (2013.01); *H04L 65/4076* (2013.01); *H04W 4/06* (2013.01); *H04W 8/005* (2013.01); *H04W 68/005* (2013.01); *H04W 76/046* (2013.01)

(58) Field of Classification Search
CPC ........................... H04W 8/005; H04W 76/023
See application file for complete search history.

(56) References Cited

U.S. PATENT DOCUMENTS

| | | | |
|---|---|---|---|
| 2014/0056220 A1 | 2/2014 | Poitau et al. | |
| 2014/0206348 A1* | 7/2014 | Johnsson | H04W 8/005 |
| | | | 455/434 |

(Continued)

FOREIGN PATENT DOCUMENTS

| | | |
|---|---|---|
| CN | 103179669 | 6/2013 |
| CN | 103731902 | 4/2014 |

OTHER PUBLICATIONS

LG Electronics Solution for EPC-level ProSe Discovery Request containing ProSe Communication Request 3GPP TSG SA Meeting #98, S2-132651.

(Continued)

*Primary Examiner* — Scott M Sciacca
(74) *Attorney, Agent, or Firm* — Renner, Otto, Boisselle & Sklar, LLP.

(57) ABSTRACT

A user equipment receives information on allocated resources for a device-to-device discovery. An enabler signaling is performed in which the user equipment is operative to determine whether a message received at a wireless interface enables the user equipment to use the allocated resources.

16 Claims, 10 Drawing Sheets

(56) References Cited

U.S. PATENT DOCUMENTS

| | | | | |
|---|---|---|---|---|
| 2014/0213250 A1* | 7/2014 | Baek | .................... | H04W 76/023 |
| | | | | 455/434 |
| 2014/0295826 A1* | 10/2014 | Choi | ................. | H04W 28/0215 |
| | | | | 455/426.1 |
| 2015/0043545 A1* | 2/2015 | Cheng | ................... | H04W 56/00 |
| | | | | 370/336 |
| 2015/0055567 A1* | 2/2015 | Narasimha | .......... | H04W 76/023 |
| | | | | 370/329 |
| 2015/0208384 A1* | 7/2015 | Baghel | ................. | H04W 72/04 |
| | | | | 455/450 |
| 2015/0264733 A1* | 9/2015 | Guo | ...................... | H04W 72/04 |
| | | | | 370/329 |
| 2015/0319595 A1* | 11/2015 | Hakola | ................. | H04W 8/005 |
| | | | | 370/254 |
| 2015/0319737 A1* | 11/2015 | Cheng | ................ | H04W 76/023 |
| | | | | 370/329 |
| 2015/0327312 A1* | 11/2015 | Burbidge | ............. | H04W 72/14 |
| | | | | 370/329 |
| 2015/0334754 A1* | 11/2015 | Lei | ....................... | H04W 8/005 |
| | | | | 455/422.1 |

OTHER PUBLICATIONS

ZTE Solution for ProSe discovery and communication 3GPP, TSG SA Meeting #96, S2-130979.

International Search Report and Written Opinion of the International Searching Authority corresponding to International Application No. PCT/CN2014/077121 mailed Feb. 13, 2015.

\* cited by examiner

USER EQUIPMENT, BASE STATION, AND METHOD OF ENABLING USAGE OF RESOURCES FOR A DEVICE-TO-DEVICE DISCOVERY

CROSS-REFERENCE TO RELATED APPLICATION

This application is a U.S. continuation patent application of Chinese PCT application PCT/CN2014/077121, filed May 9, 2014, the entire disclosure of which is hereby incorporated by reference.

FIELD OF THE INVENTION

Embodiments of the invention relate to mobile communication systems. Embodiments of the invention relate in particular to techniques for enabling usage of allocated resources for device-to-device discovery and/or device-to-device communication in mobile communication networks.

BACKGROUND OF THE INVENTION

The demand for mobile data and voice communication continues to evidence significant growth. Examples for mobile communication systems include cellular-based wireless communication networks. Such networks include various network nodes. The network nodes may include base stations which respectively provide coverage for a radio cell.

A user equipment of a mobile communication network may be a Proximity Service (ProSe) enabled device. Several ProSe enabled user equipments which are located in proximity to each other are operative to perform device-to-device (D2D) communication. D2D communication allows user equipments of a mobile communication network to directly communicate with each other when the user equipments are located in proximity to each other. D2D communication has a wide variety of applications, including public safety and other use cases. Emergency calls are one example for public safety use cases of D2D communication. Direct data or voice communication between user equipments is another example for use cases of D2D communication. For illustration, ProSe enabled user equipments located in proximity to each other may engage in data or voice communication.

In order to perform D2D communication, a user equipment must be capable of detecting one or several other user equipments which are located in proximity to the user equipment. The resources, e.g. the subcarrier frequencies, slots and/or symbols which the user equipment may use for the D2D discovery may be allocated to the user equipment by a base station. Similarly, the resources, e.g. the subcarrier frequencies, slots and/or symbols which the user equipment may use for the D2D communication may be allocated to the user equipment by a base station.

Various techniques may be used for allocating resources for D2D discovery and/or D2D communication. The base station may allocate resources for the D2D discovery and/or for the D2D communication in a manner which is not specific to a particular user equipment, e.g. by broadcasting the information on the allocated resources to a group of user equipments. In the art, this technique is also referred to as allocation of "type 1 D2D discovery resources". D2D discovery resources allocated in a manner which is not specific for a user equipment are also referred to as "type 1 D2D discovery resources" in the art.

At least for some use cases, it is attractive to allocate resources on a per-user-equipment basis. I.e., the D2D resources are allocated specifically to each user equipment. Examples for such use cases are D2D discovery and communication at advertisement points, e.g. at a mall or a retail shop, D2D discovery and communication at vending machines, or other commercial or public safety use cases. The specific allocation of resources may also be attractive to accommodate different service types or public safety use cases. In the art, this technique is also referred to as allocation of "type 2 D2D discovery resources". D2D discovery resources allocated in a manner which is specific for a user equipment are also referred to as "type 2 D2D discovery resources" in the art.

It may be difficult for the network side, e.g. the EUTRAN network, to keep track of the usage of resources and network loads for D2D discovery. As one example, when every user equipment can decide autonomously when to start using the allocated type 1 D2D discovery resources, the resources actually used for the D2D discovery and/or communication may become too high and it may be challenging to accommodate the needs of D2D discovery which should be prioritized, e.g. for public safety reasons. A dedicated signaling for authorizing the usage of D2D discovery resources may significantly increase the network loads and communication overheads if it is performed with every ProSe enabled user equipment located in the cell.

SUMMARY OF THE INVENTION

There is a need in the art for techniques which provide a cellular communication network with enhanced control over a usage of resources for a device-to-device discovery and/or a device-to-device communication.

According to exemplary embodiments of the invention, an enabling signaling is introduced to selectively enable a user equipment to use resources allocated for a device-to-device discovery signal transmission. Information on the allocated resources is provided to the user equipment before the user equipment receives a message which enables the user equipment to use the previously allocated resources. The information on the allocated resources may be transmitted in a broadcast or multicast message, e.g. a system information block, SIB, and the message may be a radio resource control, RRC, signaling message, for example, to selectively authorize one or several user equipments in a cell to use type 1 device-to-device discovery resources which were previously allocated.

By providing an enabling signaling to selectively authorize user equipments to use the allocated resources, the control of the cellular communication network over the usage of the allocated resources may be improved.

By including one or several enabling/disabling bits in a RRC signaling message, the load on the access network may be kept moderate compared to a dedicated signaling which has the sole purpose of enabling user equipments to use the allocated resources.

A node of the cellular communication network may also be configured to transmit a system information block, SIB, to all connected user equipments or to a group of connected user equipments to enable the user equipments to use the allocated resources.

The enabling signaling may be used to selectively enable and disable a user equipment to use type 1 device-to-device discovery resources and/or type 2 device-to-device discovery resources.

A user equipment according to an embodiment comprises a wireless interface configured for communication with a cellular communication network. The wireless interface is configured to receive information on resources allocated for a device-to-device discovery signal transmission. The user equipment comprises a processing device coupled to the wireless interface. The processing device is configured to determine whether a message received at the wireless interface enables the user equipment to use the allocated resources. The processing device is configured to control the wireless interface to transmit a device-to-device discovery signal using the allocated resources depending on whether the message enables the user equipment to use the allocated resources.

The user equipment of an embodiment may be configured to request the cellular communication network to enable the user equipment to use the type 1 device-to-device discovery resources, which allows the cellular communication network to keep track of the number of user equipments which actually use resources of the pool of type 1 device-to-device discovery resources.

The message may be a RRC signaling message. The RRC signaling message may include one indicator bit or several indicator bits which indicate(s) whether the user equipment is enabled or disabled to use the allocated resources for the device-to-device discovery signal transmission.

The message may be a RRC connection establishment signaling message. This allows the user equipment to be enabled or disabled to use the allocated resources for the device-to-device discovery signal transmission when the user equipment connects to the cellular communication network. No dedicated signaling in addition to the RRC connection establishment signaling which must be performed at any rate is required, thereby reducing signaling overheads.

The message may be a RRC connection release signaling message. This allows the cellular communication network to enable the user equipment to use the allocated resources for the device-to-device discovery signal transmission even when the user equipment enters idle mode.

The message may be a RRC connection reject signaling message. This allows the cellular communication network to enable the user equipment to use the allocated resources for the device-to-device discovery signal transmission even when the user equipment remains in idle mode and is not allowed to become connected.

The processing device may be configured to control the wireless interface to transmit the device-to-device discovery signal using the allocated resources while the user equipment is in idle mode, when the RRC connection release signaling message or the RRC connection reject signaling message indicates that the user equipment is enabled to use the allocated resources for the device-to-device discovery.

The message may be a RRC connection establishment signaling message.

The RRC signaling message may include one bit or several bits which indicate(s) whether the user equipment is enabled to use type 1 device-to-device discovery resources and/or type 2 device-to-device discovery resources.

The user equipment may be operative to transmit a further RRC signaling message to the cellular communication network to request the cellular communication network to enable the user equipment to use the allocated resources.

The further RRC signaling message is a RRC connection request message.

The further RRC signaling message may include a context for the request. The context may be a service type, which allows the cellular communication network to prioritize the user equipment. The context may indicate whether the user equipment requests the usage of the device-to-device discovery signal transmission resources to be enabled for a public safety communication.

The message received by the user equipment may indicate that the user equipment is not enabled to use the previously allocated device-to-device discovery signal transmission resources, but may enable the user equipment to user other resources for the device-to-device discovery signal transmission. The other resources may be type 2 device-to-device discovery resources. The message may include parameters which define the validity for the usage of the other resources. The parameters may comprise information on a validity period and/or validity area.

The processing device may be configured to determine whether the message comprises information on other allocated resources different from the allocated resources. The processing device may be configured to selectively control the wireless interface to transmit the device-to-device discovery signal using the other allocated resources when the message comprises the information on the other allocated resources.

Even when the message enables the user equipment to use the allocated resources, the user equipment may be operative to receive a further message with information on further resources different from the originally allocated resources. The further resources may be type 2 device-to-device discovery resources. The further message may include parameters which define the validity for the usage of the further resources. The parameters may comprise information on a validity period and/or validity area. The user equipment may automatically fall back to the allocated resources when the validity period has expired and/or the user equipment leaves the validity area.

The message which indicates whether the user equipment is enabled to use the allocated resources for the device-to-device discovery signal transmission may be a broadcast or multicast message. This allows the cellular communication network to disable the use of the allocated type 1 resources by all connected user equipment or by a group of connected user equipments, with very little load on the air interface. This also allows the cellular communication network to enable the use of the allocated type 1 resources by all connected user equipment or by a group of connected user equipments, with very little load on the air interface.

The information on the allocated resources is included in a broadcast message or in a multicast message. The broadcast message or multicast message may comprise a system information block which includes the information on the allocated resources.

A cellular communication network node according to an embodiment comprises a wireless interface configured to broadcast information on resources allocated for a device-to-device discovery signal transmission. The cellular communication network node comprises a control device coupled to the wireless interface. The control device is configured to determine whether a user equipment is to be enabled to use the allocated resources for the device-to-device discovery signal transmission. The control device is configured to control the wireless interface to selectively transmit a RRC signaling message to the user equipment which indicates whether the user equipment is enabled to use the allocated resources for the device-to-device discovery signal transmission.

The cellular communication network node may be a base station. The base station may be an evolved NodeB (eNodeB). The base station and the user equipment may be operative to communicate with each other over an evolved UTRA (E-UTRA) air interface.

The cellular communication network node is configured to perform an enabling signaling for enabling a user equipment to user previously allocated device-to-device discovery resources. This enhanced the control which the cellular communication network has over the usage of the allocated resources.

The cellular communication network node may be configured to transmit the information on the resources allocated for the device-to-device discovery signal transmission in a broadcast message or a multicast message. The cellular communication network node may be configured to generate and transmit a system information block, SIB, which includes the information on the resources allocated for the device-to-device discovery signal transmission in a broadcast message or a multicast message.

The cellular communication network node may be configured to monitor how many user equipments are enabled to user the resources allocated for the device-to-device discovery signal transmission. The control device may be configured to selective enable the user equipment to use the resources allocated for the device-to-device discovery signal transmission depending on how many user equipments are presently enabled to use these resources and/or depending on other criteria.

The cellular communication network node may be configured to evaluate a service level or other context, e.g. indicator for public safety, of the user equipment. The cellular communication network node may be configured to determine whether the user equipment shall be enabled or shall not be enables to user a resource from the pool for the resources allocated for the device-to-device discovery signal transmission. The cellular communication network node may be configured to determine whether the user equipment shall be enabled to use type 2 device-to-device discovery resources instead of the type 1 device-to-device discovery resources, and may transmit the message to indicate the type 2 device-to-device discovery resources.

The cellular communication network node may be configured to selectively allocate user equipment specific, i.e. type 2, device-to-device discovery resources to the user equipment if the user equipment has a service level which causes the user equipment to be prioritized over other user equipments. Alternatively or additionally, the cellular communication network node may be configured to selectively allocate user equipment specific, i.e. type 2, device-to-device discovery resources to the user equipment if the user equipment performs public safety communication.

The cellular communication network node may be configured to transmit the message such that it indicates whether the user equipment is enabled to use type 1 device-to-device discovery resources and/or type 2 device-to-device discovery resources.

The control device of the cellular communication network node may be configured to transmit the message with an indicator to enable or disable the user equipment to user the allocated resources for the device-to-device discovery signal transmission in response to receiving a further message from the user equipment. The further message may comprise information on a context, e.g. a service level or information on public safety related communication, for the user equipment.

The cellular communication network node may be configured such that the message which is transmitted to enable the user equipment to use the allocated resources for the device-to-device discovery signal transmission is a RRC signaling message, e.g. a RRC connection establishment signaling message, a RRC connection reconfiguration signaling message, or a RRC connection release signaling message, as explained with reference to the user equipment according to embodiments.

The cellular communication network node may be configured to determine whether all connected user equipment or a group of connected user equipment is to be enabled or is to be disabled to use the allocated resources for the device-to-device discovery signal transmission. The cellular communication network node may be configured to transmit a system information block, SIB, which indicates that all connected user equipments or a group of connected user equipments is enabled or is disabled to use the allocated resources for the device-to-device discovery signal transmission.

According to another embodiment, a communication system is provided. The communication system comprises the cellular communication network and one or several user equipments according to an embodiment.

A method of enabling usage of resources for a device-to-device discovery according to an embodiment comprises receiving, by a user equipment, information on resources allocated for a device-to-device discovery signal transmission. The method comprises determining, by the user equipment, whether a message received from a cellular communication network enables the user equipment to use the allocated resources. The method comprises controlling the wireless interface to transmit a device-to-device discovery signal using the allocated resources when the message enables the user equipment to use the allocated resources.

Additional features of the method according to embodiments and the effects respectively attained thereby correspond to the features of user equipments according to embodiments and of cellular communication network nodes according to embodiments.

The method may be performed by the user equipment according to any one of the embodiment described herein.

According to another embodiment, a communication system is provided which comprises a base station according to an embodiment and at least one user equipment according to an embodiment.

In the methods, devices, and systems according to embodiments, the allocated resources for the device-to-device discovery signal transmission may be periodic uplink resources. The periodic uplink resources may be divided into time-frequency resources. The periodic uplink resources may be divided into time-frequency resources according to frequency division multiplexing (FDM) and/or time division multiplexing (TDM).

In the methods, devices, and systems according to embodiments, a user equipment may be enabled to use allocated resources for the device-to-device discovery signal transmission. The cellular communication network may control how many user equipments actually use type 1 device-to-device discovery resources. The signaling overhead required to implement this control may be kept moderate by including enable/disable indicator bits in RRC signaling messages or a SIB. In various embodiments, a cellular communication network can control a usage of allocated resources for the device-to-device discovery and/or the device-to-device communication without requiring a dedicated signaling only for the purpose of authorizing each user equipment to use the allocated resources.

Although specific features described in the above summary and the following detailed description are described in the context of specific embodiments and aspects of the invention, the features of the embodiments and aspects may be combined with each other unless specifically noted otherwise.

BRIEF DESCRIPTION OF THE DRAWINGS

Embodiments of invention will now be described in more detail with reference to the accompanying drawings in which like or identical reference numerals designate like or identical elements.

DETAILED DESCRIPTION OF PREFERRED EMBODIMENTS

Figure 1:
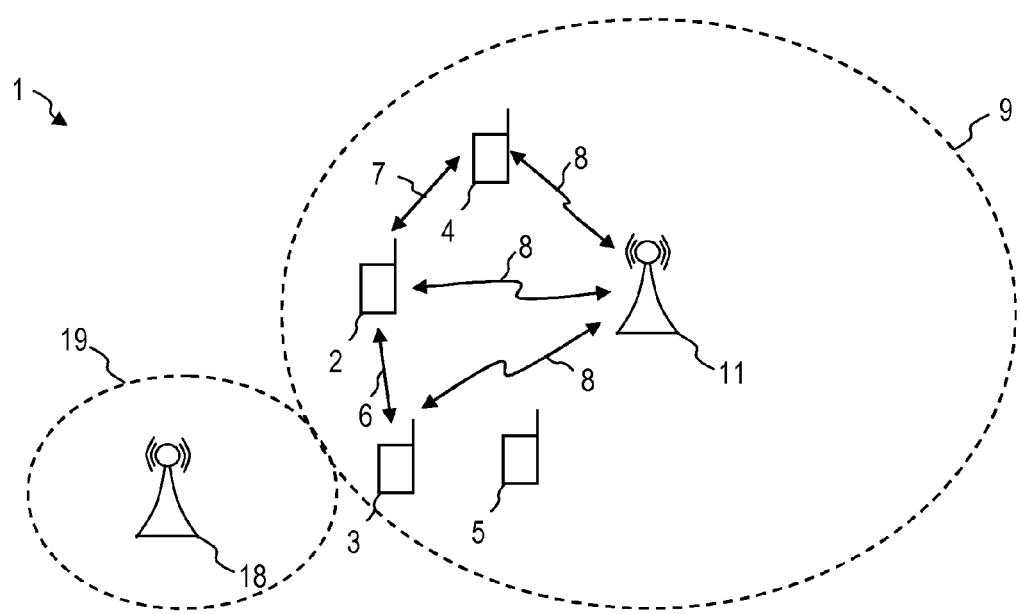
FIG. 1 shows a communication system according to an embodiment.

In the following, exemplary embodiments of the invention will be described in more detail. It has to be understood that the features of the various exemplary embodiments described herein may be combined with each other unless specifically noted otherwise. Identical or similar reference numerals refer to identical or similar components.

While exemplary embodiments will be described with reference to certain use cases for device-to-device (D2D) communication, it is to be understood that the techniques for D2D discovery and D2D communication may be used for a wide variety of use cases, including public safety use cases and other commercial use cases. While exemplary embodiments will be described in the context of certain cellular mobile communication networks, e.g. Long Term Evolution (LTE) networks, the embodiments are not described to such mobile communication techniques.

While exemplary embodiments will be described with reference to a base station which transmits information on allocated resources, it is to be understood that a user equipment may receive information on the allocated resources also from a repeater relay or another user equipment which acts as a group head for D2D communication, for example.

FIG. 1 shows a communication system 1 according to an embodiment. The communication system 1 includes a mobile communication system which is configured as a cellular communication network. The cellular communication network may comprise a plurality of base stations 11, 18. The base stations 11, 18 may communicate with each other via wireless radio communications or via an operator core network. The cellular communication network may be a Long Term Evolution (LTE) network. A radio access network (RAN) of the cellular communication network may be an evolved UTRAN (E-UTRAN), with the base station 11, 18 being an evolved Node B (eNodeB). The base stations 11, 18 may be connected to a Mobility Management Entity (MME) and/or Serving Gateway (S-GW) in the operator core network.

The base station 11 provides a radio cell 9 in which user equipments (UEs) 2, 3, 4, 5 may communicate directly with the base station 11 via radio communication 8. The UEs 2, 3, 4, 5 may respectively have a wireless interface for communication with the E-UTRAN. The base station 18 provides another radio cell 19.

At least one of the UEs 2, 3, 4, 5 is capable of performing a D2D discovery for D2D communication. According to the terminology in the pertinent field of the art, the term D2D communication refers to a radio communication between UEs which is performed directly between the UEs. The radio signals 6, 7 transmitted in the D2D communication may not be processed by the base stations 11, 18. The radio signals 6, 7 transmitted in the D2D communication may not pass the RAN of the communication network. The radio signals 6, 7 transmitted in the D2D communication may not be processed by a core network of the wireless cellular communication network. The UEs which are configured for D2D communication may use the same wireless interface for communicating with the RAN and for D2D communication. A UE configured for D2D discovery and D2D communication may also be referred to as Proximity Service (ProSe)-enabled UE in the art.

In order to identify suitable communication partners for D2D communication, a UE capable of performing D2D communication may be configured to perform a D2D discovery. In the D2D discovery, a UE may discover at least one further UE located in proximity of the UE and configured to engage in D2D communication with the UE. The D2D discovery may include a radio signaling between UEs which is performed directly between the UEs. The radio signals transmitted in the D2D discovery may not be processed by the base station 11. The radio signals transmitted in the D2D discovery may not pass through the RAN of the communication network. The radio signals transmitted in the D2D discovery may not be processed by a core network of the wireless cellular communication network. The UEs which are configured for D2D communication may use the same wireless interface for communicating with the RAN and for D2D discovery.

The UEs 2, 3, 4 which are configured for D2D communication may use allocated resources for a D2D discovery signal transmission. The allocated resources for the D2D discovery signal transmission may be allocated to the UEs 2, 3, 4 by the base station 11, by a repeater relay or by another UE. The allocated resources for the D2D discovery signal transmission may respectively be allocated by the base station 11 by a broadcast or multicast message. For illustration, the UEs 2, 3, 4 may respectively receive information on the allocated resources for the D2D discovery signal transmission in a system information block (SIB) which may be transmitted by the cellular communication network. Even when the UEs 2, 3, 4 receive this information, i.e., information on type 1 D2D discovery resources, the UEs 2, 3, 4 may be configured to request authorization to use the allocated resources for the D2D discovery signal transmission before they transmit a D2D discovery signal.

In the following, the resources which are allocated to a UE for D2D discovery signal transmission and/or for D2D communication in a non-UE-specific manner will also be referred to as "allocated resources". The allocated resources may be used at least for D2D discovery, for example. The allocated resources may be periodic uplink resources. The allocated resources may be divided in the time domain, e.g. according to time division multiplexing (TDM), and/or in the frequency domain, e.g. according to frequency division multiplexing (FDM). The UEs 2, 3, 4 may use at least one physical resource block for the D2D discovery and/or D2D communication which would otherwise be used for uplink communication with the base station of the serving cell.

As will be described in more detail below, the base station 11, 18 is configured to enable a UE 2 to select s resource from the allocated resources for D2D discovery signal transmission. The base station 11, 18 may be configured to transmit a RRC signaling message which includes at least one enable/disable indicator bit to the UE 2, to thereby indicate whether the UE is enabled to use the allocated resources for the D2D discovery signal transmission. The UE 2 may request the base station 11, 18 to enable it to use the allocated resources for the D2D discovery signal transmission. The UE 2 may transmit a RRC signaling message, e.g. a RRC Connection request message, to the base station 11, 18, which includes at least one indicator bit to indicate that the UE 2 requests to be enabled to use the allocated resources. Alternatively or additionally, the base station 11, 18 may be configured to transmit a SIB which includes at least one enable/disable indicator bit to several connected UEs 2, 3, 4, to thereby indicate that the UEs 2, 3, 4 are all enabled or disabled to use the allocated resources for the D2D discovery signal transmission.

The base station 11, 18 may be configured to control the usage of the allocated resources for D2D discovery signal transmission based on any one or several criteria. The base station 11, 18 may monitor a number of UEs which are presently enabled to use the allocated resources for the D2D discovery signal transmission. The base station 11, 18 may respond to a request from a UE 2 by allowing or not allowing the UE 2 to select a resource from the allocated resources for the D2D discovery signal transmission, depending on the total number of UEs which are presently enabled to use the allocated resources for the D2D discovery signal transmission. Alternatively or additionally, the base station 11, 18 may take a decision on whether the UE 2 is permitted to select a resource from the allocated resources for the D2D discovery signal transmission depending on a service level of the UE 2 and/or depending on whether the UE 2 performs public safety communication.

When the base station 11, 18 does not permit the UE 2 to select a resource from the allocated resources for the D2D discovery signal transmission, the base station 11, 18 may allocate other resources to the UE 2. These other resources may be type 2 D2D discovery resources, which are allocated on a UE-specific basis. The base station 11 18 may take a decision on whether type 2 D2D discovery resources are allocated to the UE 2 depending on a service level of the UE 2 and/or depending on whether the UE 2 performs public safety communication.

Various implementations of an enabling signaling for enabling or disabling usage of the resources allocated for the D2D discovery signal transmission may be used, as will be explained in more detail with reference to FIG. 3 to FIG. 14.

Figure 2:
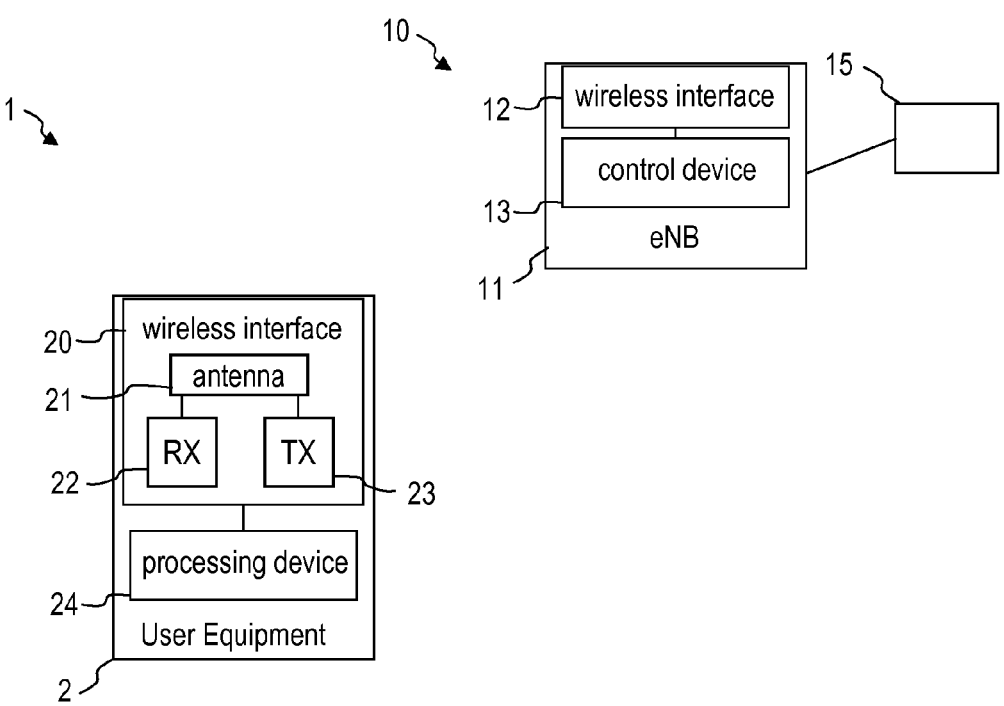
FIG. 2 shows the communication system of FIG. 1, which includes a Proximity Service-enabled user equipment.

FIG. 2 is a schematic block diagram of a communication system 1 according to an embodiment. The base station 11 of the RAN 10 is connected to a node 15 of the RAN or the core network (CN). For illustration, for a base station 11 implemented as an eNodeB, the node 15 may be an MME or S-GW.

The UE 2 has a wireless interface 20. The wireless interface 20 may be configured to communicate with the RAN 10. The wireless interface 20 may be configured for communication over the E-UTRA air interface.

The UE 2 has a processing device 24 connected to the wireless interface 20. The processing device 24 may comprise one or several microprocessors, one or several microcontrollers, one or several processors, one or several controllers, one or several application specific integrated circuits (ASICs) and/or a combination of such devices.

The processing device 24 may be configured to retrieve information on the allocated resources for a D2D discovery signal transmission from a broadcast message received at the wireless interface 20. The processing device 24 may be configured to determine whether a message received from the base station 11 at the wireless interface 20 includes enabler signaling which enables the UE 2 to use the allocated resources for the D2D discovery signal transmission. The processing device 24 may be configured to execute a wide variety of other functions which allow the mobile communication network to control the usage of the allocated resources by the UE 2 for D2D discovery and/or D2D communication.

When the UE 2 is in the connected mode and/or when the UE 2 is in the idle mode, the processing device 24 may be configured to control the wireless interface 20 to detect a further UE 3 located in proximity to the UE 2. The processing device 24 may be configured to control the wireless interface 20 to control a transmitter path 23 of the wireless interface 20 to transmit a D2D discovery signal to the further UE 3 via an antenna 21 to indicate that the UE 2 is looking for a further UE for D2D communication and/or to indicate that the UE 2 would be capable of performing D2D communication. The processing device 24 may be configured to use resources selected from the pool of the allocated resources for the D2D discovery signal transmission. The processing device 24 may be coupled to a receiver path 22 of the wireless interface 20 to process a message received from the further UE 3. The message received from the further UE 3 may indicate that the further UE 3 would be suitable for D2D communication.

The base station 11 includes a wireless interface 12. The wireless interface 12 may be configured to communicate with the UE 2. The wireless interface 12 may be configured for communication over the E-UTRA air interface.

A control device 13 of the base station 11 may control the wireless interface 12 to allocate resources for the D2D discovery and to transmit a message to the UE 2 which enables the UE 2 to use the allocated resources for the D2D discovery signal transmission. The control device 13 may comprise one or several microprocessors, one or several microcontrollers, one or several processors, one or several controllers, one or several application specific integrated circuits (ASICs) and/or a combination of such devices.

The control device 13 may control the wireless interface 12 to transmit a broadcast or multicast message which includes information on the allocated resources for the D2D discovery signal transmission. The control device 13 may control the wireless interface 12 to transmit a RRC signaling message or a SIB message which includes one enabler bit or several enabler bits to indicate whether the UE 2 is enabled to select a resource from the allocated resources for the D2D discovery signal transmission.

The control device 13 may control a usage of the allocated resources for D2D discovery signal transmission according to various criteria. The control device 13 may monitor how many connected and/or idle UEs are enabled to use the allocated resources for the D2D discovery signal transmission. The control device 13 may take a decision on whether a requesting UE shall be allowed to use the allocated type 1 D2D discovery resources and/or specifically allocated type 2 D2D discovery resources based on a service level or other context of the requesting UE.

Figure 3:
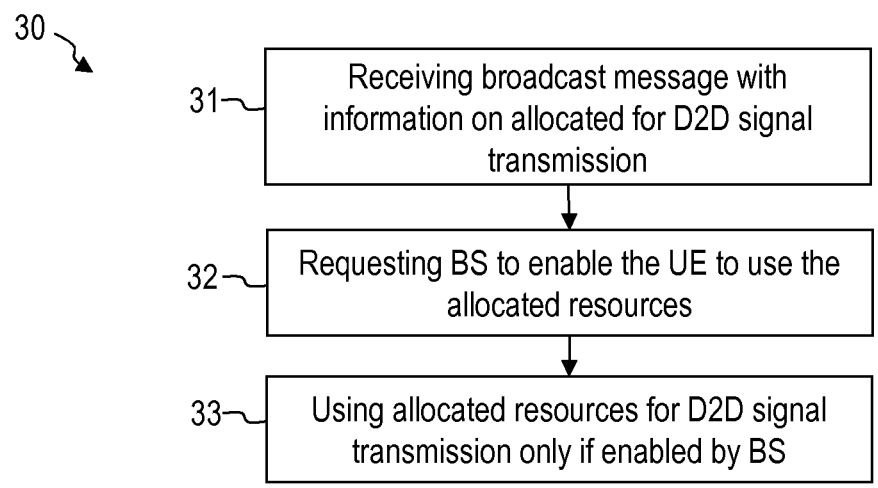
FIG. 3 is a flow chart of a method according to an embodiment.

FIG. 3 is a flow chart of a method 30 according to an embodiment. The method 30 may be performed by a UE according to an embodiment.

At 31, the UE receives a D2D resource allocation message from a cellular communication network. The D2D resource allocation message may be a broadcast message or a multicast message. Information on allocated resources for a D2D discovery signal transmission may be included in a SIB.

At 32, the UE may request a base station to enable the UE to use the allocated resources for the D2D discovery signal transmission. The UE may request a connection with the cellular communication network to request the base station to enable the UE to use the allocated resources for the D2D discovery signal transmission. The UE may monitor a trigger event, e.g. an emergency call scenario, which causes the UE to request the base station to enable the UE to use the allocated resources for the D2D discovery signal transmission. The request may be included in a RRC connection request message. The RRC connection request message may include a context for the request, e.g. a service level of the UE and/or an indicator whether the D2D communication is required for a public safety communication.

The RRC connection request message may include a cause which is indicative for an authorization to use the allocated resources for the D2D discovery signal transmission. For illustration, an EstablismentCause of the RRC connection request message may be set to indicate that the cause for the RRC connection request message is that the UE seeks authorization to use the allocated D2D discovery resources for the D2D discovery signal transmission. An EstablishmentCause "D2D discovery resource" may be defined for this purpose.

At 33, the UE may transmit a D2D discovery signal using a resource selected from the allocated resources for the D2D discovery signal transmission, provided that the base station permits the UE to select a resources from these allocated resources for the D2D discovery signal transmission. When the base station does not permit the UE to select a resource from these allocated resources for the D2D discovery signal transmission, the UE does not use any one of these resources for transmitting the D2D discovery signal. When the base station allocates other resources to the UE, e.g. type 2 D2D discovery resources, the UE may transmit the D2D discovery signal using these other resources.

Figure 4:
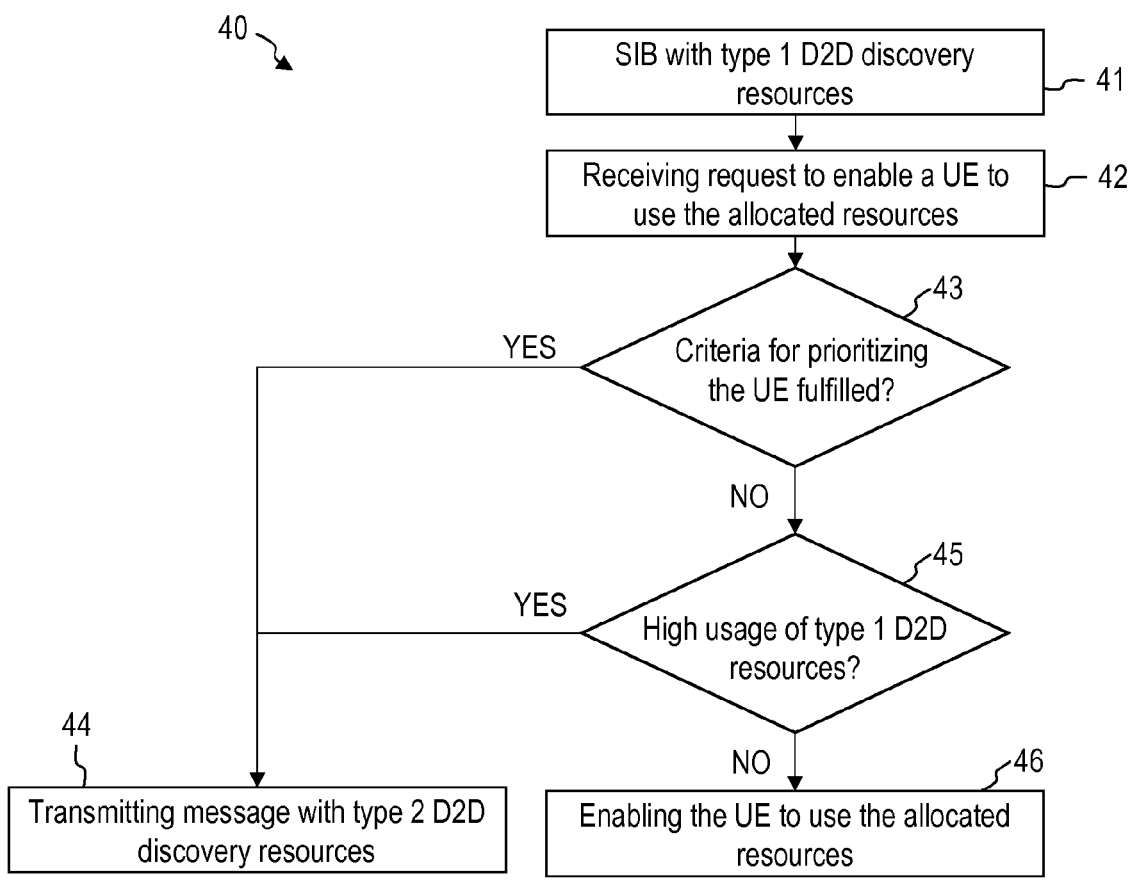
FIG. 4 is a flow chart of a method according to an embodiment.

FIG. 4 is a flow chart of a method 40. The method 40 may be performed by a base station according to an embodiment.

At 41, the base station transmits a multicast or broadcast message to allocated resources for the D2D discovery signal transmission to a plurality of UEs. The base station may transmit the information on the allocated resources for the D2D discovery signal transmission in a SIB. While the UEs are provided with the information on the type 1 D2D discovery resources by the message transmitted at 41, the UEs are not authorized to use a resource from this resource pool unless they obtain authorization from the base station.

At 42, the base station receives a request from a UE, with which the UE requests the base station to enable the UE to use the allocated resources for the D2D discovery At 43, the base station may determine whether the UE is to be prioritized over other UEs. For illustration, the base may determine whether the UE has a service level higher than a service level of other UEs. The base station may determine whether the UE performs public safety communication. If the UE is to be prioritized over other UEs, the method may proceed to step 44. At step 44, the base station may allocate other resources different from the type 1 D2D discovery resources to the UE. At step 44, the base station may allocate type 2 D2D discovery resources to the UE and may disable the UE to use the type 1 D2D discovery resources. The base station may transmit a RRC signaling message to the UE to allocate the type 2 D2D discovery resources for the D2D discovery signal transmission to the UE.

At 45, if the UE is not to be prioritized, the base station determines whether the usage of the type 1 D2D discovery resources is already high. The base station may determine a number of UEs which are presently enabled to use a resource from the type 1 D2D discovery resources to a threshold. If the base station determines that the usage of the type 1 D2D discovery resources is not too high and the UE may be enabled to use a resource selected from the type 1 D2D discovery resources, the method proceeds to step 46.

At 46, the base station may transmit a message to the UE to enable the UE to use a resource selected from the type 1 D2D discovery resources. The message may comprise validity information and may define a validity period and/or validity area, for example.

If the base station determines at 45 that the usage of the type 1 D2D discovery resources is already high, the base station may allocate a type 2 D2D discovery resource to the UE at step 44. Alternatively, the base station may inform the UE that it is not enabled to select a resource of the type 1 D2D discovery resources for the transmission of the D2D discovery signal, and that it is not enabled to use a type 2 D2D discovery resource for the transmission of the D2D discovery signal.

The message transmitted at step 44 or at step 46 may be a RRC signaling message. The message may be a RRC connection setup message, a RRC reconfiguration message, a RRC connection reject message, a RRC connection release message, or another RRC message. The message may include any information element required according to 3GPP TS 25.331 or 3GPP TS 36.331, but with one or several additional indicator bits which indicate whether the UE is enabled to use type 1 D2D discovery resources and/or type 2 D2D discovery resources. The message may include any information element required according to 3GPP TS 25.331 V12.1.0 (2014-03) entitled "3rd Generation Partnership Project; Technical Specification Group Radio Access Network; Radio Resource Control (RRC); Protocol specification (Release 12)", but with one or several additional indicator bits which indicate whether the UE is enabled to use type 1 D2D discovery resources and/or type 2 D2D discovery resources. The message may include any information element required according to 3GPP TS 36.331 V12.1.0 (2014-03) entitled "3rd Generation Partnership Project; Technical Specification Group Radio Access Network; Evolved Universal Terrestrial Radio Access (E-UTRA); Radio Resource Control (RRC); Protocol specification (Release 12)", but with one or several additional indicator bits which indicate whether the UE is enabled to use type 1 D2D discovery resources and/or type 2 D2D discovery resources.

The message which indicates whether the UE is enabled to use type 1 D2D discovery resources and/or type 2 D2D discovery resources may include an indication of the resource, in particular when the UE is allocated the type 2 D2D discovery resource at step 44. The message which indicates whether the UE is enabled to use type 1 D2D discovery resources and/or type 2 D2D discovery resources may include a validity time.

When receiving such an enabling signaling, the UE will use the resource for the D2D signal discovery transmission when it gets connected. The UE may use the resource even when it remains or enters idle mode, e.g. when the enabler signaling is included in a RRC connection reject or a RRC connection release message.

The message may include only one enabler bit. The enabler bit may indicate whether the UE is enabled to use the type 1 D2D discovery resources. The enabler bit may indicate whether the UE is enabled to use the type 2 D2D discovery resources. The enabler bit may indicate whether the UE is enabled to use both the type 1 D2D discovery resources and the type 2 D2D discovery resources.

When the UE is enabled to use only one of the type 1 D2D discovery resources or the type 2 D2D discovery resources, only a resource selected from the respective pool of resources may be used by the UE.

The message transmitted at step 44 or step 46 may also be a system information message, which may include information that all connected UEs or a group of connected UEs are respectively enabled or disabled to use the type 1 D2D discovery resources and/or the type 2 D2D discovery resources. The SIB may also include information on the respective resource and validity time.

The base station may also use a dedicated signaling to indicate a discovery resource to a UE. The dedicated signaling will overwrite the information included in the RRC setup procedure and/or in a SIB. When the base station disables a resource from the dedicated signaling, the UE may fall back to use the resource signaled in SIB or in the RRC setup procedure.

Figure 5:
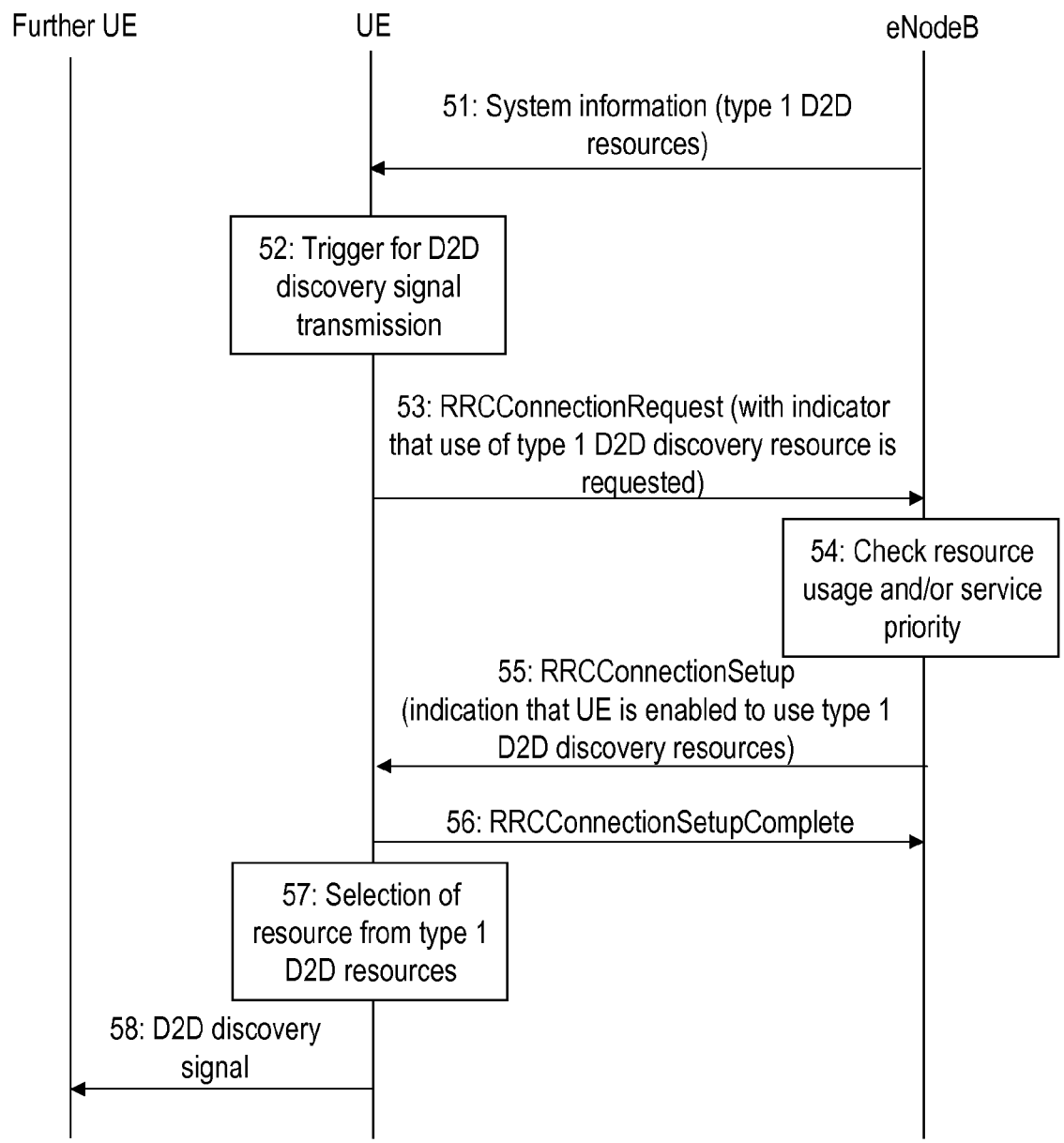
FIG. 5 is a diagram which shows a signaling in a communication system according to an embodiment.

FIG. 5 is a diagram which illustrates signaling in a communication system according to an embodiment. The eNodeB transmits system information 51. The system information 51 may comprise a SIB. The system information may define resources allocated for a D2D discovery signal transmission.

The UE may detect a trigger event 52 which causes the UE to request to be enabled to use the resources allocated for the D2D discovery signal transmission. The trigger event 52 may be a user input action or the initiation of public safety communication.

In response to the trigger even, the UE performs a RRC connection setup with the eNodeB. The UE may transmit a RRC connection request message 53 to the eNodeB. The RRC connection request message 53 may include an information element which indicates that the UE requests to be enabled to use the resources allocated for the D2D discovery signal transmission. The information element may be an EstablishmentCause of the RRC connection request message 53 of 3GPP TS 25.331 or 3GPP TS 36.331 which indicates that purpose for the RRC connection request message 53 is that the UE requests to be enabled to use the allocated resources for the D2D discovery signal transmission. The RRC connection request message 53 may include an information element which defines a context for the request, e.g. a service level or whether the D2D discovery is to be performed for public safety communication.

The eNodeB may perform an evaluation 54 to determine whether the UE may be enabled to use the allocated type 1 D2D resources and/or whether type 2 D2D resources are to be allocated to the UE. The eNodeB may perform the evaluation 54 taking into account the usage of the type 1 D2D resources, e.g. the total number of UEs which has been enabled to use a resource from the pool of type 1 D2D resources, and/or a service priority. The service priority may be based on the service level or whether the communication is public safety communication.

When the eNodeB determines that the UE may be allowed to use a resource from the allocated type 1 D2D resources, the eNodeB may transmit a RRC connection setup message 55 which includes one indicator bit or several indicator bits to indicate that the UE may use a resource from the allocated type 1 D2D resources for the D2D discovery signal transmission. The UE transmits a RRC connection setup complete message 56 to the eNodeB.

When in connected mode, the UE performs a selection 57 to select a resource from the allocated type 1 D2D resources for the D2D discovery signal transmission. The UE transmits a D2D discovery signal 58 using the selected resource which is taken from the pool of the allocated type 1 D2D resources.

Figure 6:
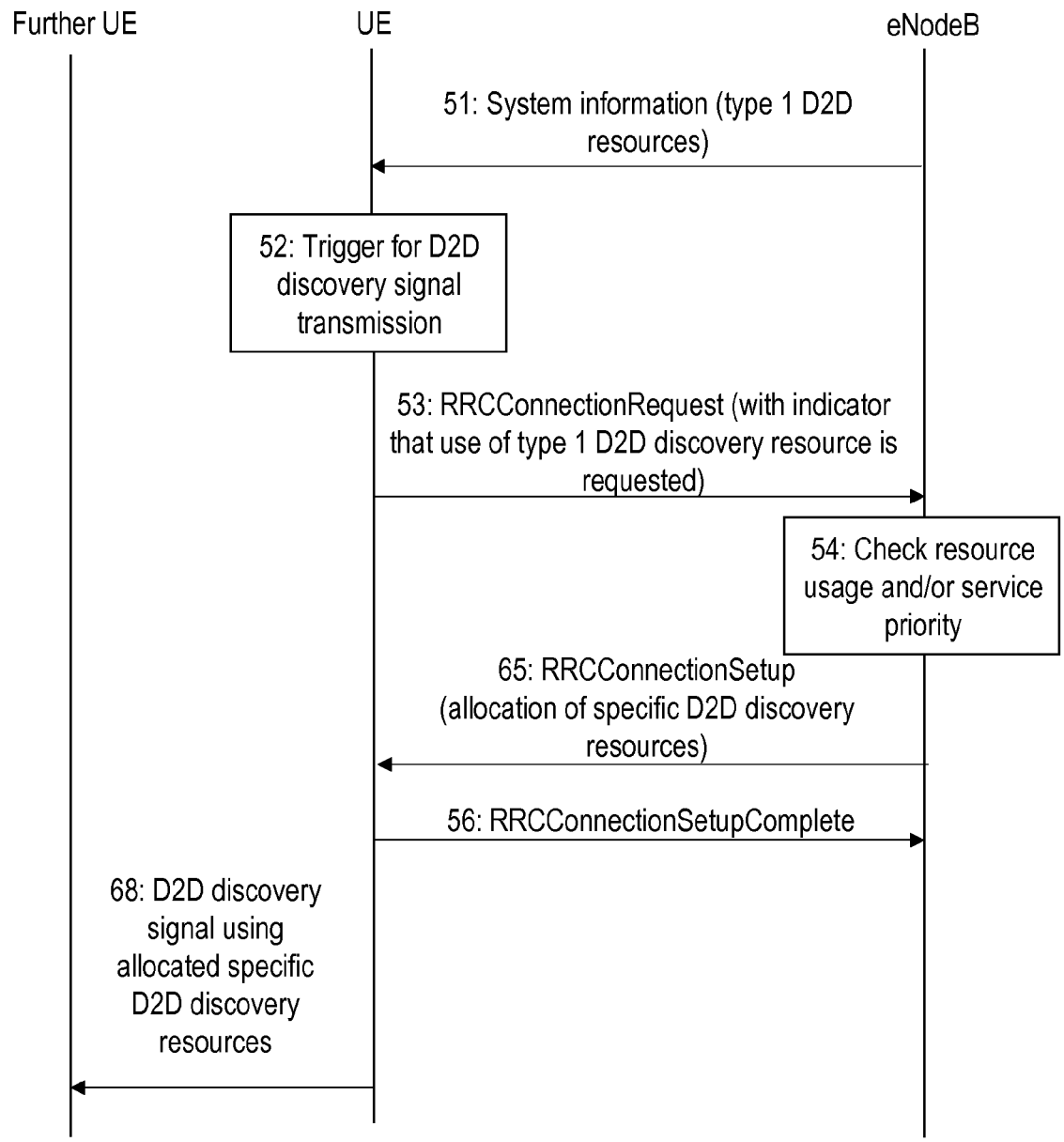
FIG. 6 is a diagram which shows a signaling in a communication system according to an embodiment.

FIG. 6 is a diagram which illustrates signaling in a communication system according to an embodiment. In the signaling of FIG. 6, the eNodeB determines in the evaluation 54 that the UE shall not be enabled to use a resource from the allocated type 1 D2D resources, but shall be enabled to use a resource from type 2 D2D resources. This may be the case when the eNodeB determines that the usage of the allocated type 1 D2D resources meets a pre-defined criterion and/or that the UE shall be prioritized due to its service level or as a public safety user.

The eNodeB the eNodeB may transmit a RRC connection setup message 55 which includes one indicator bit or several indicator bits to indicate that the UE is not enabled to use a resource from the allocated type 1 D2D resources for the D2D discovery signal transmission. The RRC connection setup message 55 may indicate that the UE is enabled to user a resource from type 2 D2D resources. One or several parameters of the resource may be defined in the RRC connection setup message 55. A validity time of the resource may also be defined in the RRC connection setup message 55.

The UE transmits a D2D discovery signal 68 using the allocated resource from type 2 D2D resources.

When the eNodeB determines in the evaluation 54 that neither a resource from the type 1 D2D resources nor a specifically allocated resource from the type 2 D2D resources may be used by the UE, the RRC connection setup message 55 may include one indicator bit or several indicator bits which indicate that the UE may neither use a resource from the type 1 D2D resources nor a specifically allocated resource from the type 2 D2D resources for the D2D discovery signal transmission.

The enabler signaling which enables or disables a UE to use type 1 D2D resources and/or type 2 D2D resources may be implemented in a variety of other ways, as will be illustrated in more detail with reference to FIG. 7 to FIG. 14.

Figure 7:
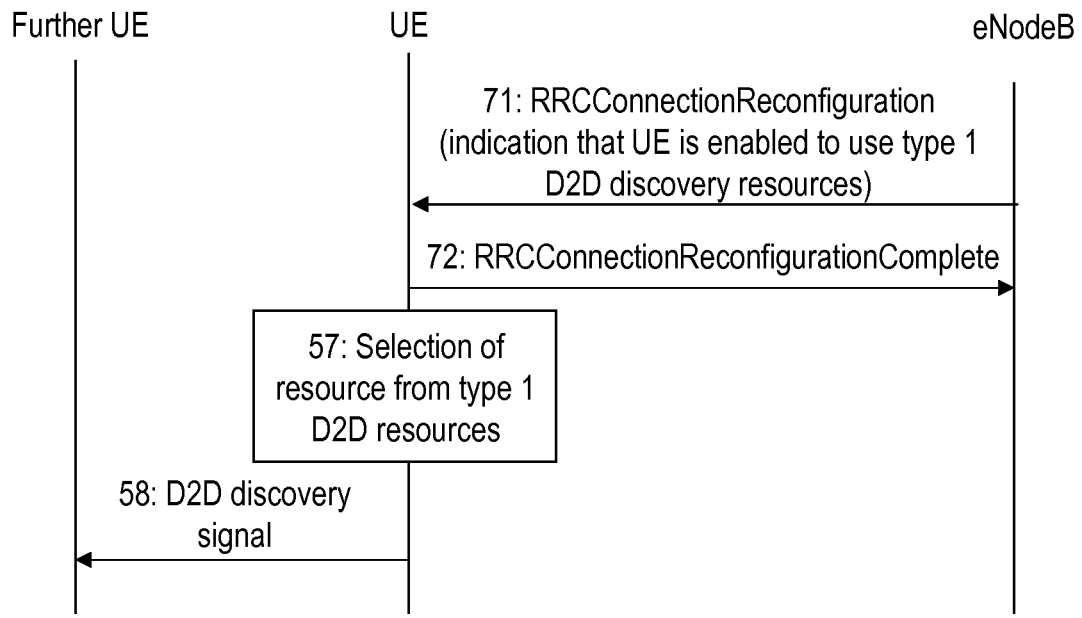
FIG. 7 is a diagram which shows a signaling in a communication system according to an embodiment.

FIG. 7 is a diagram which illustrates signaling in a communication system according to an embodiment. The eNodeB may perform an evaluation 54 to determine whether the UE may be enabled to use the allocated type 1 D2D resources and/or whether type 2 D2D resources are to be allocated to the UE. When the eNodeB determines that the UE may be allowed to use a resource from the allocated type 1 D2D resources, the eNodeB may transmit a RRC connection reconfiguration message 71 which includes one indicator bit or several indicator bits to indicate that the UE may use a resource from the allocated type 1 D2D resources for the D2D discovery signal transmission. The UE may transmit the RRC connection setup complete message 72 to the eNodeB. The UE may perform a selection 57 and may transmit a D2D discovery signal, as explained with reference to FIG. 5.

The base station may also enable the UE to use the allocated type 1 D2D resources and/or type 2 D2D resources for the D2D discovery signal transmission when the UE remains in or enters idle mode. The base station may include enabler signaling in a RRC connection reject message and/or a RRC connection release message for this purpose, as will be explained in more detail with reference to FIG. 8 and FIG. 9.

Figure 8:
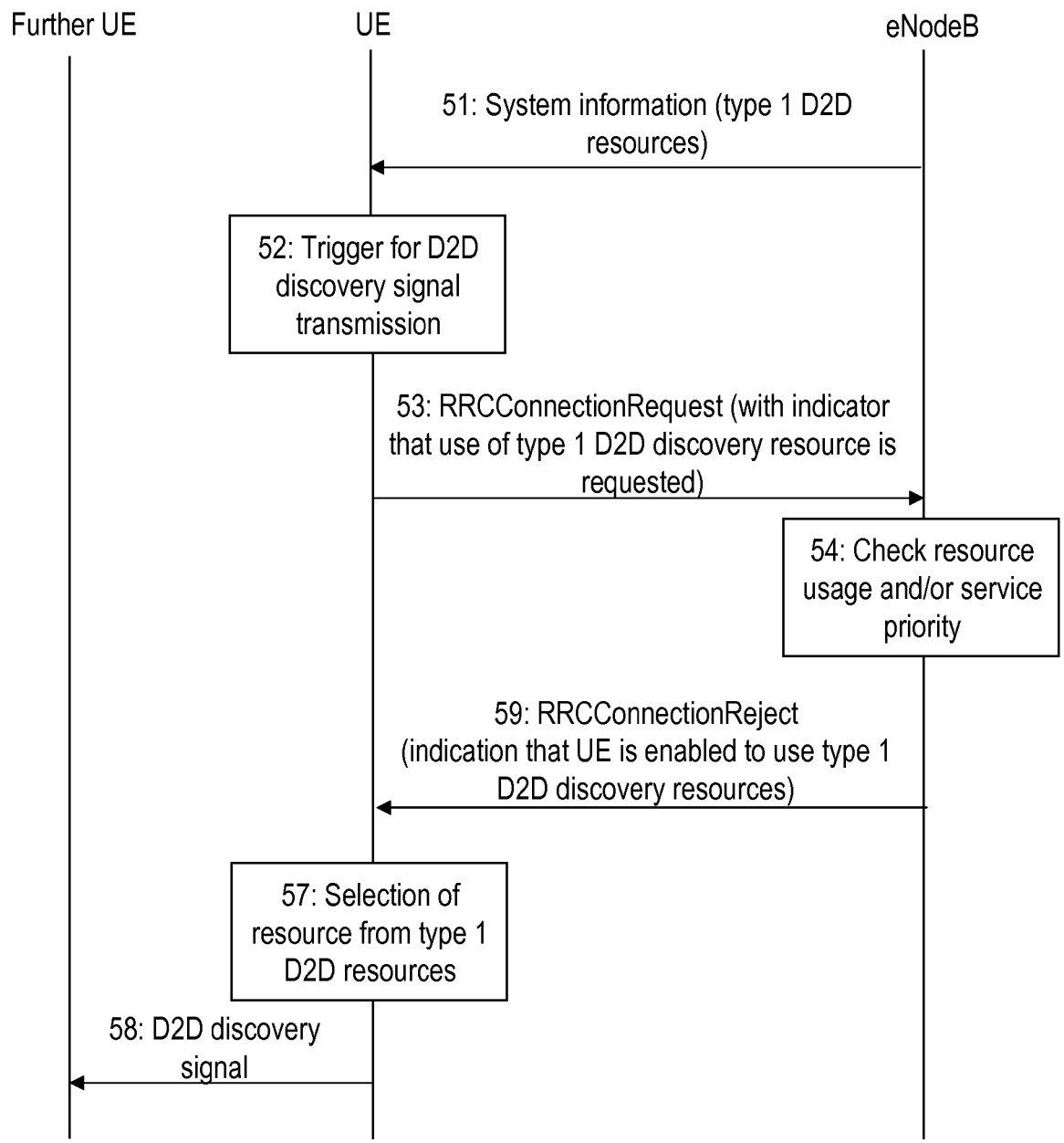
FIG. 8 is a diagram which shows a signaling in a communication system according to an embodiment.

FIG. 8 is a diagram which illustrates signaling in a communication system according to an embodiment. When the eNodeB determines that the UE may be allowed to use a resource from the allocated type 1 D2D resources, the eNodeB may transmit a RRC connection reject message 59 which includes one indicator bit or several indicator bits to indicate that the UE may use a resource from the allocated type 1 D2D resources for the D2D discovery signal transmission.

While in idle mode, the UE performs a selection 57 to select a resource from the allocated type 1 D2D resources for the D2D discovery signal transmission. The UE transmits a D2D discovery signal 58 using the selected resource which is taken from the pool of the allocated type 1 D2D resources.

Figure 9:
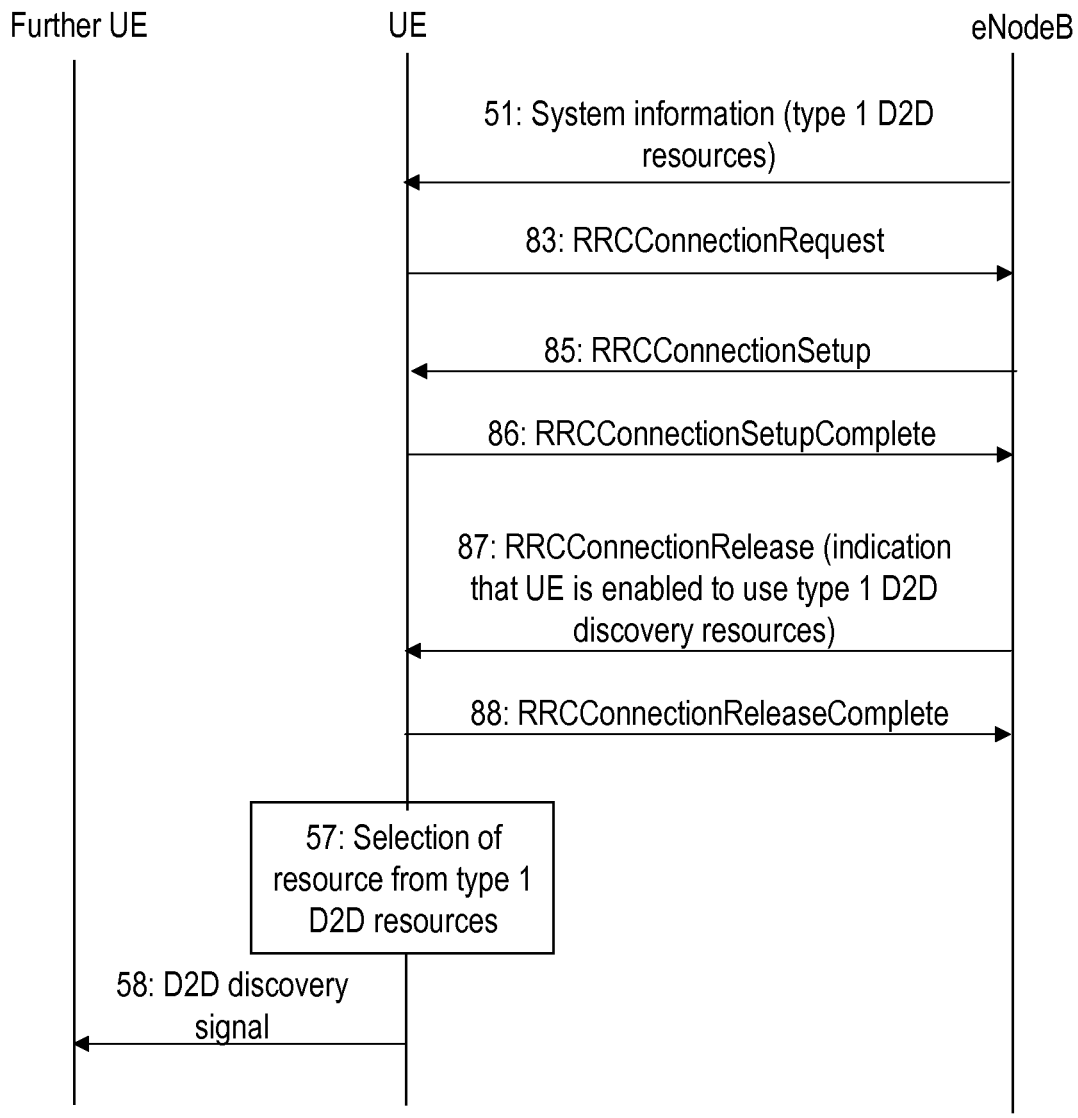
FIG. 9 is a diagram which shows a signaling in a communication system according to an embodiment.

FIG. 9 is a diagram which illustrates signaling in a communication system according to an embodiment. A conventional RRC connection establishment procedure may be performed by transmitting a RRC connection request message 83, a RRC connection setup message 85, and a RRC connection setup complete message 89. The RRC connection request message 83 may, but does not need to include any indication that the UE requests to be enabled to use a resource from the pool of allocated type 1 D2D resources. Likewise, the RRC connection setup message 85 may but does not need to include enabler signaling which enables the UE to use a resource from the pool of allocated type 1 D2D resources.

The eNodeB may transmit a RRC connection release message 87 which includes enabler signaling which enables the UE to use a resource from the pool of allocated type 1 D2D resources. For illustration, the RRC connection release message 87 may include one indicator bit or several indicator bits which indicate that the UE is enabled to use a resource from the pool of allocated type 1 D2D resources. Alternatively, the RRC connection release message 87 may also indicate that the UE is enabled to use a resource from a pool of type 2 D2D resources which is allocated on a per-UE basis, or that the UE is neither enabled to use a resource from the type 1 D2D resources nor from the type 2 D2D resources.

While in idle mode, the UE performs a selection 57 to select a resource from the allocated type 1 D2D resources for the D2D discovery signal transmission. The UE transmits a D2D discovery signal 58 using the selected resource which is taken from the pool of the allocated type 1 D2D resources.

Figure 10:
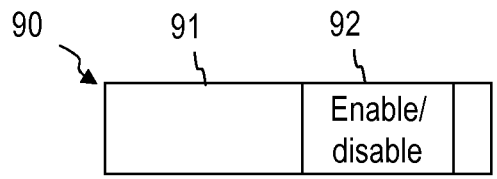
FIG. 10 shows a RRC signaling message which may be transmitted to a user equipment according to an embodiment.

FIG. 10 illustrates a RRC signaling message 90 which may be transmitted from the eNodeB to the UE. The RRC signaling message 90 may be a RRC connection setup message, a RRC connection reconfiguration message, a RRC connection reject message, or a RRC connection release message, for example. The RRC signaling message 90 includes at least one indicator bit 92 which can be set to a first value to indicate that the UE is enabled to select a resource from the allocated resources for the D2D discovery signal transmission and to second value different from the first value to indicate that the UE is not enabled to select a resource from the allocated resources for the D2D discovery signal transmission. The RRC signaling message 90 may include a single indicator bit 92 which enables or disables the usage of the type 1 D2D discovery resources. The RRC signaling message 90 may include several indicator bits 92 which enables or disables the usage of the type 1 D2D discovery resources. The RRC signaling message 90 may include other data 91, e.g. the information elements required for the respective RRC signaling message 90 according to 3GPP TS 25.331 or 3GPP TS 26.331.

Figure 11:
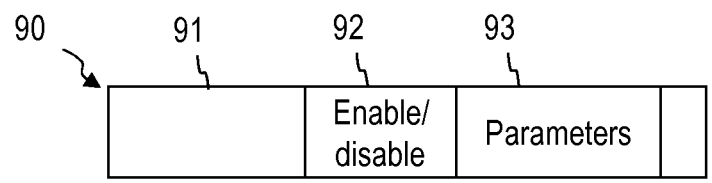
FIG. 11 shows a RRC signaling message which may be transmitted to a user equipment according to an embodiment.

FIG. 11 illustrates a RRC signaling message 90 which may be transmitted from the eNodeB to the UE. The RRC signaling message 90 may be a RRC connection setup message, a RRC connection reconfiguration message, a RRC connection reject message, or a RRC connection release message, for example. The RRC signaling message 90 includes at least one indicator bit 92 which can be set to a first value to indicate that the UE is enabled to select a resource from the allocated resources for the D2D discovery signal transmission and to second value different from the first value to indicate that the UE is not enabled to select a resource from the allocated resources for the D2D discovery signal transmission. The RRC signaling message 90 includes one parameter or several parameters 93. The parameter(s) 93 may include a resource index which indicates a resource taken from a pool of type 2 D2D discovery resources in the time or frequency domain. Alternatively or additionally, the parameter(s) 93 may include a validity time which defines a time period for which the UE may use the type 2 D2D discovery resource for the D2D discovery signal transmission. Alternatively or additionally, the parameter(s) 93 may include a validity area which defines in which area the UE may use the type 2 D2D discovery resource for the D2D discovery signal transmission.

In any one of the methods, devices and systems described herein, the UE may actively request that it will be enabled to use the allocated type 1 D2D resources for D2D discovery signal transmission.

In addition or as an alternative to enabling one UE at a time to use a resource from the allocated resources for the D2D discovery signal transmission, the base station may transmit system information as a broadcast or multicast message to all connected UEs or a group of connected UEs, to enable or disable the use of a resource from the allocated pool of type 1 D2D resources and/or of a type 2 D2D resource for all of these UEs. This may be useful for example when the cellular network experiences a high load on the EUTRAN side. The D2D discovery can then be disabled for all UEs, while reducing signaling.

Figure 12:
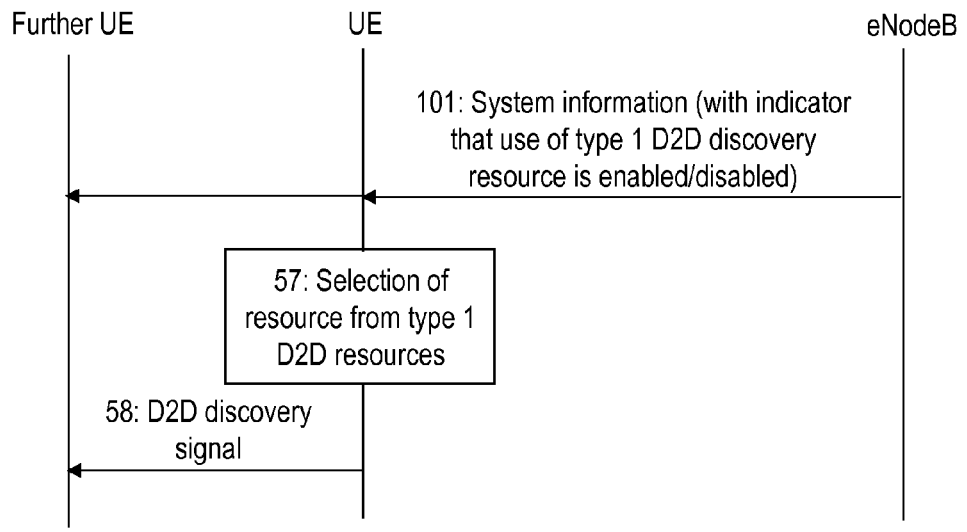
FIG. 12 is a diagram which shows a signaling in a communication system according to an embodiment.

FIG. 12 is a diagram which illustrates signaling in a communication system according to an embodiment. The eNodeB transmits system information 101 as a broadcast or multicast message. The system information 101 includes one indicator bit or several indicator bits which indicate(s) that the UEs are enabled or disabled to use allocated resources for the D2D discovery.

The system information 101 may include enabler signaling which enables or disables the use of allocated resources from the pool of type 1 D2D resources. The system information 101 may include enabler signaling which enables or disables the use of allocated resources from the pool of type 2 D2D resources. The system information 101 may include enabler signaling which enables or disables the use of allocated resources from both the pool of type 1 D2D resources and the pool of type 2 D2D resources. The system information 101 may be transmitted to collectively enable or disable the D2D discovery for several UEs.

When the system information 101 includes an indicator bit or several indicator bits which enables the UE and the further UE to select a resource from the type 1 D2D resources for the D2D discovery signal transmission, the UE may perform a selection 57 to select a resource and may transmit a D2D discovery signal 58, as explained with reference to FIG. 5. When the system information 101 includes an indicator bit or several indicator bits which disables the UE and the further UE to select a resource from the type 1 D2D resources for the D2D discovery signal transmission, the UE may not transmit the D2D discovery signal 58.

Figure 13:
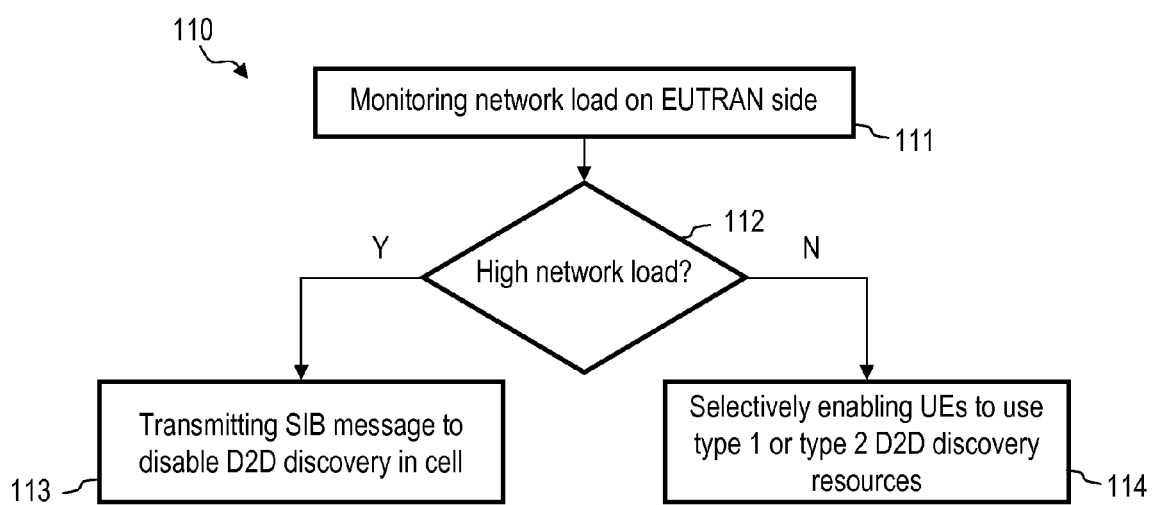
FIG. 13 is a flow chart of a method according to an embodiment.

FIG. 13 is a flow chart of a method 110 according to an embodiment. The method 110 may be performed by the base station according to an embodiment.

At 111, the base station may monitor a load on the EUTRA air interface. At 112, the base station may determine whether the load fulfills a predefined criterion. The base station may determine whether the load is so high that the D2D discovery should be disabled for a plurality of UEs.

At 113, when the base station determines that the network load on the EUTRA air interface is high, the base station may transmit a system information message to disable the D2D discovery for several UEs or for all connected UEs.

At 114, when the base station determines that the network load on the EUTRA air interface is not too high, the base station may continue to enables individual UEs to use type 1 D2D discovery resources and/or type 2 D2D discovery resources. The techniques described with reference to FIG. 1 to FIG. 11 may be used at step 114.

Figure 14:
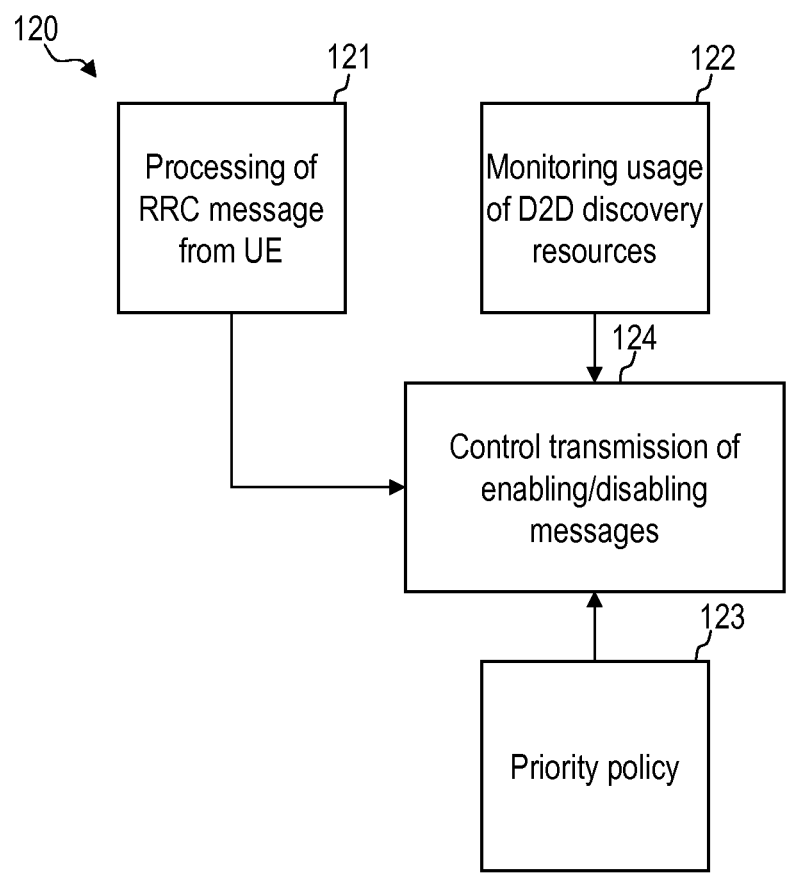
FIG. 14 is a functional block diagram of a cellular communication network node according to an embodiment.

FIG. 14 is a functional block diagram 120 of a base station according to an embodiment. The modules may be implemented in hardware, software, firmware, or a combination thereof.

The base station may comprise a processing module 121 for processing a RRC message received from a UE. The processing module 121 may be configured to determine whether the UE requests authorization to use resources allocated for the D2D discovery signal transmission and which were previously transmitted to the UE, e.g. in a SIB.

The base station may comprise a monitoring module 122 which monitors a usage of the resources allocated for the D2D discovery signal transmission. The monitoring module 122 may monitor a number of UEs which are presently enabled to select a resource from the pool of the resources allocated for the D2D discovery signal transmission.

The base station may comprise a priority policy module 123 which determines whether the UE shall be treated preferentially, e.g. because of its service level or because it is a pubic safety user.

The base station may comprise an evaluation module 124 which determines whether the UE shall be enabled to use a resource from the type 1 D2D discovery resources allocated for the D2D discovery signal transmission and/or shall be enabled to use a resource from the type 2 D2D discovery resources. The evaluation module 124 may take this decision based on the current usage of the resources allocated for the D2D discovery signal transmission and/or based on whether the UE is to be treated preferentially.

In operation, the base station may start enabling UEs to select a resource from the pool of type 1 D2D discovery resources allocated for the D2D discovery signal transmission as long as the total number of UEs which are presently enabled to use such a resource is less than a threshold. Once the total number of UEs which are presently enabled to use such a resource is greater than or exceeds the threshold, the base station may start allocated resources from the pool of type 2 D2D discovery resources and/or may refuse to enable the UE to perform any D2D discovery. Priority users having a high service level and/or public safety users may generally be allocated resources from the pool of type 2 D2D discovery resources. When a high load on the air interface is detected, a SIB may be transmitted to disable the use of the allocated resources for several UEs or for all connected UEs.

In any one of the various embodiments, the D2D discovery and/or the D2D communication performed by a UE may include the transmission and/or reception of messages which takes place over the same interface with which the UE communicates with the RAN.

Modifications or alterations may be implemented in other embodiments. For illustration, resources may be allocated to the UE not only directly by a base station, but also by another UE which acts as a group head for a D2D communication group, or by a repeater relay. For further illustration, while RRC connection establishment signaling, RRC connection reconfiguration signaling, and/or RRC connection release signaling may be used by the eNodeB to enable the UE to use type 1 D2D discovery resources and/or type 2 D2D discovery resources, other messages may be used for these control operation.

Embodiments of the invention provide a mobile communication network with enhanced control over the usage of allocated resources by a UE for D2D discovery and/or D2D communication.

What is claimed is:

1. A wireless communication system user equipment, comprising:
  a user equipment; and
  a base station connected to a cellular communication network, the base station comprising a first wireless interface configured to broadcast information on resources allocated for a device-to-device (D2D) discovery signal transmission; and
  control circuitry coupled to the first wireless interface, the control circuitry being configured to control the first wireless interface to transmit a message which indicates whether the user equipment is enabled to use the allocated resources for the D2D discovery signal transmission, the control circuitry further configured to
    determine whether the user equipment is to be prioritized over other user equipment, and when the user equipment is to be prioritized over the other user equipment, generate a message that i) allocates resources to the user equipment that are different from type 1 D2D discovery resources, ii) allocates type 2 D2D discovery resources to the user equipment, or iii) disables the user equipment from using the type 1 D2D discovery resources, and
    when the user equipment is not to be prioritized over the other user equipment, determine a usage level of the type 1 D2D discovery resources, and when the usage level is below a threshold level generate a message that enables the user equipment to use a resource selected from a type 1 D2D discovery resource, and when the usage level is greater than the prescribed threshold level, generate a message that allocates a type 2 D2D discovery resource to the user equipment, or disables the user equipment from selecting a type 1 D2D discovery resource for the transmission of a D2D discovery signal and from using a type 2 discovery resource for the transmission of a D2D discovery signal;

the user equipment comprising a second wireless interface configured for communication with the base station, the second wireless interface being configured to receive information on resources allocated for D2D discovery signal transmission; and a processor coupled to the second wireless interface, the processor being configured to determine whether a message received at the second wireless interface enables the user equipment to use the allocated resources; and control the wireless interface to transmit a device-to-device discovery signal using the allocated resources depending on whether the message enables the user equipment to use the allocated resources.

2. The system of claim 1,
wherein the message is a RRC connection establishment signaling message.

3. The system of claim 1,
wherein the processor is configured to control the second wireless interface to transmit the device-to-device discovery signal using the allocated resources while the user equipment is in idle mode.

4. The system of claim 1, wherein the processor is configured to transmit a further RRC signaling message to the base station to request the cellular communication network to enable the user equipment to use the allocated resources.

5. The system of claim 4,
wherein the further message is a RRC connection request message.

6. The system of claim 1,
wherein the information on the allocated resources is included in a broadcast message or in a multicast message.

7. The system of claim 1,
wherein the processor is configured
to determine whether the message comprises information on other allocated resources different from the allocated resources, and
to selectively control the second wireless interface to transmit the device-to-device discovery signal using the other allocated resources when the message comprises the information on the other allocated resources.

8. The system of claim 7,
wherein the message comprising the information on the other allocated resources comprises at least one parameter of the other allocated resources.

9. The system according to claim 1, wherein the message is an RRC connection establishment signaling message or an RRC connection release signaling message, and wherein the RRC signaling message includes at least one bit which indicates whether the user equipment is enabled to use type 1 device-to-device discovery resources and/or type 2 device-to-device discovery resources.

10. A cellular communication network node, comprising:
a wireless interface configured to broadcast information on resources allocated for a device-to-device (D2D) discovery signal transmission, and
control circuitry coupled to the wireless interface, the control circuitry being configured to determine whether a user equipment is to be enabled to use the allocated resources for the device-to-device discovery signal transmission, and control the wireless interface to transmit a message which indicates whether the user equipment is enabled to use the allocated resources for the device-to-device discovery signal transmission, where in performing the determination the control circuitry is configured to determine whether the user equipment is to be prioritized over other user equipment, and when the user equipment is to be prioritized over the other user equipment generate a message that i) allocates resources to the user equipment that are different from type 1 D2D discovery resources, ii) allocates type 2 D2D discovery resources to the user equipment, or iii) disables the user equipment from using the type 1 D2D discovery resources, and when the user equipment is not to be prioritized over the other user equipment, determine a usage level of the type 1 D2D discovery resources, and when the usage level is below a threshold level generate a message that enables the user equipment to use a resource selected from a type 1 D2D discovery resource, and when the usage level is greater than the prescribed threshold level generate a message that allocates a type 2 D2D discovery resource to the user equipment, or disables the user equipment from selecting a type 1 D2D discovery resource for the transmission of a D2D discovery signal and from using a type 2 discovery resource for the transmission of a D2D discovery signal.

11. The cellular communication network node of claim 10,
wherein the control circuitry is configured to generate the message such that it includes information on other allocated resources different from the allocated resources.

12. The cellular communication network node of claim 10,
wherein the control circuitry is configured to evaluate at least one of:
a load on an air interface of the cellular communication network;
a service level of the user equipment; and/or
whether the user equipment is a public safety user,
to determine whether the user equipment is to be enabled to use the allocated resources for the device-to-device discovery signal transmission.

13. The cellular communication network node of claim 10,
wherein the message is a radio resource control, RRC, signaling message.

14. The cellular communication network node of claim 10,
wherein the message is a RRC connection establishment signaling message or a RRC connection release signaling message.

15. The cellular communication network node of claim 10,
wherein the RRC signaling message includes at least one bit which indicates whether the user equipment is enabled to use type 1 device-to-device discovery resources and/or type 2 device-to-device discovery resources.

16. The cellular communication network node according to claim 10, wherein the message is an RRC connection establishment signaling message or an RRC connection release signaling message, and wherein the RRC signaling message includes at least one bit which indicates whether the user equipment is enabled to use type 1 device-to-device discovery resources and/or type 2 device-to-device discovery resources.

* * * * *